United States Patent [19]

Corbett

[11] Patent Number: 5,119,778
[45] Date of Patent: Jun. 9, 1992

[54] TUNED INTAKE AIR SYSTEM FOR A ROTARY ENGINE

[75] Inventor: William D. Corbett, Fond du Lac, Wis.

[73] Assignee: Brunswick Corporation, Skokie, Ill.

[21] Appl. No.: 633,226

[22] Filed: Dec. 20, 1990

[51] Int. Cl.⁵ ............................................. F02B 53/00
[52] U.S. Cl. ...................................... 123/216; 418/86
[58] Field of Search ................... 123/52 M, 216, 242; 418/86

[56] References Cited

U.S. PATENT DOCUMENTS

| | | | |
|---|---|---|---|
| 3,370,575 | 2/1968 | Soubis | 123/216 |
| 3,967,593 | 7/1976 | Garside | 418/86 X |
| 4,000,721 | 1/1977 | Garside | 418/86 X |
| 4,911,122 | 3/1990 | Corbett et al. | 123/216 |

Primary Examiner—Michael Koczo
Attorney, Agent, or Firm—Andrus, Sceales, Starke & Sawall

[57] ABSTRACT

A tuned combustion air intake system for a rotary engine used in an outboard motor includes a plenum chamber mounted on the rear of the engine directly against the exhaust manifold, which plenum receives cooling air discharged from the engine. Air from the plenum chamber is directed into an elongated outlet conduit having an extended tuned length to provide an optimum pulsed air flow to the combustion air inlet of the engine. Direct attachment of the plenum chamber and integral outlet conduit to the rear of the engine eliminates extended length tubular connections of the prior art and allows the width of the engine to be kept to a minimum, thereby adapting the system to enclosure in a conventional cowl for an outboard motor.

7 Claims, 3 Drawing Sheets

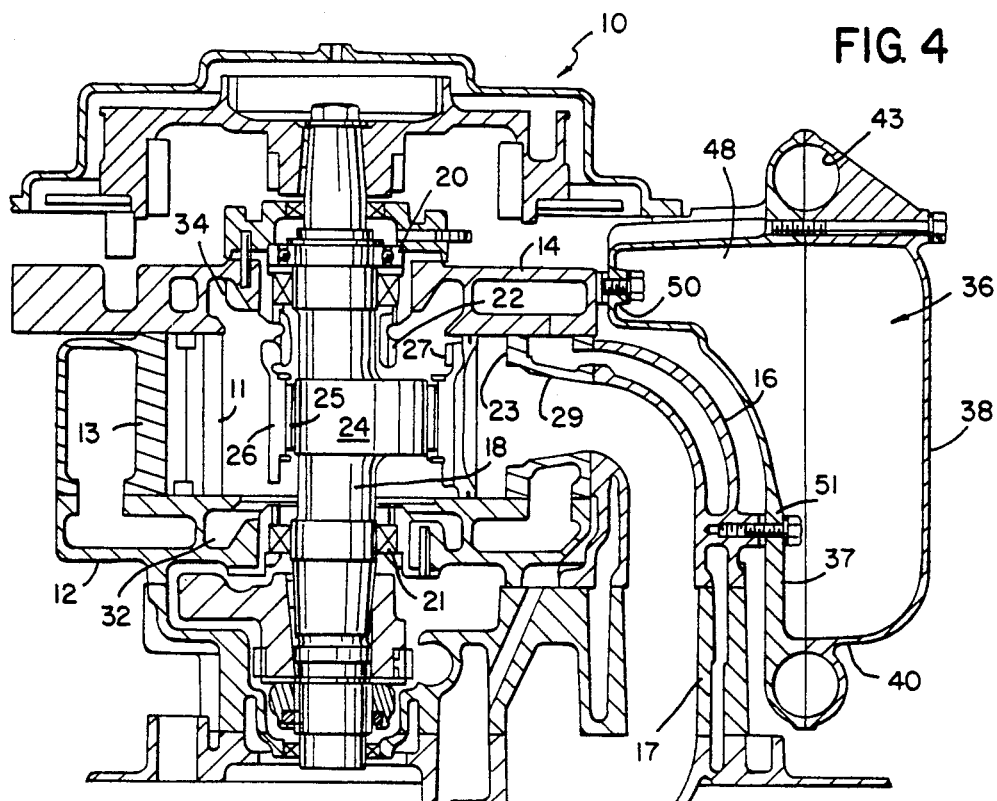
FIG. 4
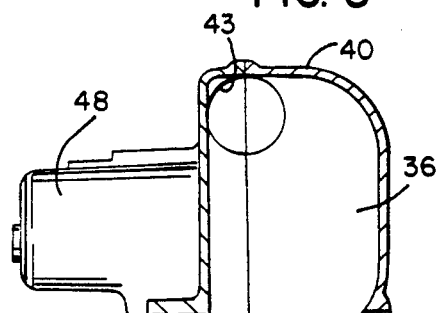
FIG. 5
FIG. 6
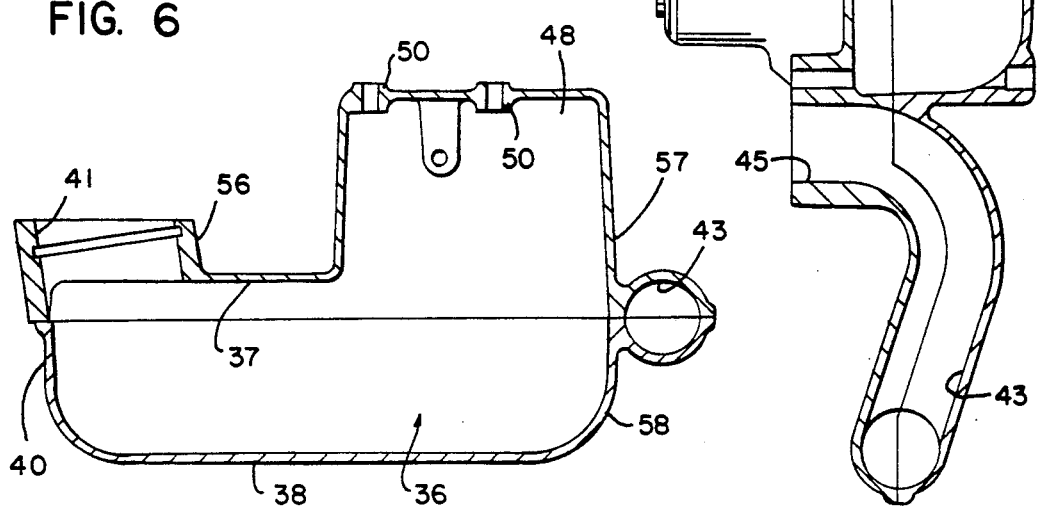

TUNED INTAKE AIR SYSTEM FOR A ROTARY ENGINE

BACKGROUND OF THE INVENTION

The present invention relates to an intake air system for a rotary engine and, more particularly, to an integral plenum chamber and tuned intake air conduit which receives cooling air from the engine and directs it to the carburetor for mixture and intake with fuel.

The rotary internal combustion engine has gained significant acceptance and is being used more widely in a variety of automotive applications. One of the major attractions of the rotary engine is its relative simplicity of construction as compared to more conventional reciprocating piston engines. In addition, advances in engineering technology have eliminated or substantially alleviated certain design and operational problems previously associated with rotary piston engines, such as rotor seal efficiency and life. As a result, additional applications for the rotary engine are marine use and, in particular, in outboard boat motors.

As with any other internal combustion engine where a flow of intake air is induced by operation of the engine, the intake of combustion air in a rotary engine may also be induced by engine rotation. A rotary engine may also often be air cooled or may include a combination of air and water cooling. If air cooling is utilized, cooling air flow is also induced by engine rotation. For the sake of convenience and simplicity of engine construction, a single flow of air is utilized both for engine cooling and for combustion. Thus, after a flow of air is directed through the engine rotor chamber of for cooling, it is directed into the carburetor or other combustion air inlet, mixed with the fuel and passed into the combustion region of the rotor chamber.

It is well known in the art of internal combustion engines, including rotary piston engines, that an induced flow of intake combustion air is not provided at a constant flow volume. Instead, the typical intake and exhaust strokes of an engine cycle (whether a two-stroke or four-stroke cycle) will result in a pulsed flow of air. The pulsed flow results in waves which travel back and forth through the intake air system such that the desirable maximum intake air volume is not always available for the intake stroke. Thus, a "tuning" or balancing of the intake air flow may be undertaken to provide a high pressure wave front pushing a maximum volume of air through the carburetor or combustion air inlet and into the combustion chamber at the most efficient point in the intake stroke.

Intake air tuning generally requires the use of an intake air conduit of substantial length but, depending upon the average engine speed at which performance is desired to be optimized, the length of the intake air conduit may vary substantially. The tuning length providing the best average performance for the specific application is, therefore, chosen with some resulting sacrifice in performance at other speeds. Unfortunately, the optimization of intake air flow in a rotary engine requires a tuned inlet air conduit of considerable length. Where a rotary engine is used in an outboard motor, the conservation of space and the need to keep overall engine size to a minimum are key considerations. Thus, the rather considerable length of an optimally tuned intake air conduit poses a significant space problem in an outboard motor application.

Another concern relating to available space in adapting a rotary engine for use in an outboard motor is the need to fit the engine into the typical enclosing envelope used for outboard motors. In particular, the rotary engine must be adapted to fit within the engine-enclosing cowl in a manner similar to a conventional reciprocating piston engine. The rotary engine is disposed with its rotor shaft extending vertically in the same manner as a conventional engine. However, with its combustion air inlet and exhaust manifold positioned rearwardly in the most convenient orientation, the width of the rotary engine block becomes a limiting factor when attempting to fit the engine into a conventional cowl. U.S. Pat. No. 4,911,122 shows an intake air inlet for a rotary engine which includes a plenum chamber and inlet conduit having a tuned length which are attached directly to the side of the engine block. However, when utilizing this construction in an outboard motor, the plenum chamber and outlet conduit occupy too much volume to fit within a conventional cowl envelope. Nevertheless, the plenum chamber volume and conduit length must be retained in order to provide optimum engine performance. Further, the general orientation of the rotary engine must also be maintained and, therefore, direct mounting of the plenum to the cooling air exit passage, as described in the above identified U.S. Patent, cannot be effectively utilized. In addition, that patent also discloses a large rearwardly disposed elbow connecting the outlet conduit to the carburetor inlet. This elbow occupies a large volume of space both to the side and the rear of the engine which also unacceptable when trying to fit the package into a conventional outboard motor engine cowl.

SUMMARY OF THE INVENTION

In accordance with the present invention the space occupied by a long, tuned combustion intake air conduit for a rotary engine is substantially reduced by combining the intake air conduit with an intake air plenum chamber and wrapping the intake air conduit around the chamber. The rigidity and strength of the assembly is also enhanced by constructing the outlet conduit integrally with the plenum chamber.

In the preferred embodiment of the invention, an intake air plenum chamber is attached to the rear of the engine. The plenum chamber receives cooling air exiting from the engine block via an inlet conduit connected to an inlet air opening in the inner wall of the plenum chamber. The plenum chamber also includes an outlet air opening adapted to be connected directly to an outlet conduit having an appropriately selected tuned length. The opposite end of the outlet conduit terminates in a combustion air outlet to supply air for engine combustion. The outlet conduit from the plenum chamber is wrapped around the chamber to accommodate the substantially increased conduit length which is typically greater than the normal distance from the plenum chamber air outlet to the carburetor or other combustion air inlet to the engine.

The plenum chamber preferably comprises an inner wall attached to the exhaust manifold at the rear of the engine, an outer wall disposed closely spaced from and generally parallel to the inner wall, and an enclosing side wall connecting the inner and outer walls. The plenum chamber is constructed and mounted such that the inlet air opening is located in the plenum inner wall and is connected by a short inlet conduit with the cooling air outlet passage from the engine block. The outlet air opening from the plenum chamber connects directly to the tuned outlet conduit. The outlet conduit, in the form of a cylindrical tube is integral with and wrapped around the side wall of the plenum chamber. The combustion air outlet in the other end of the conduit is disposed in the plenum inner wall and attached directly to the engine carburetor.

BRIEF DESCRIPTION OF THE DRAWINGS

FIG. 4 is a sectional side elevation similar to FIG. 2.

FIG. 5 is a sectional view taken on line 5—5 of FIG. 3.

FIG. 6 is a sectional view taken on line 6—6 of FIG. 3.

DETAILED DESCRIPTION OF THE PREFERRED EMBODIMENTS

Figure 1:
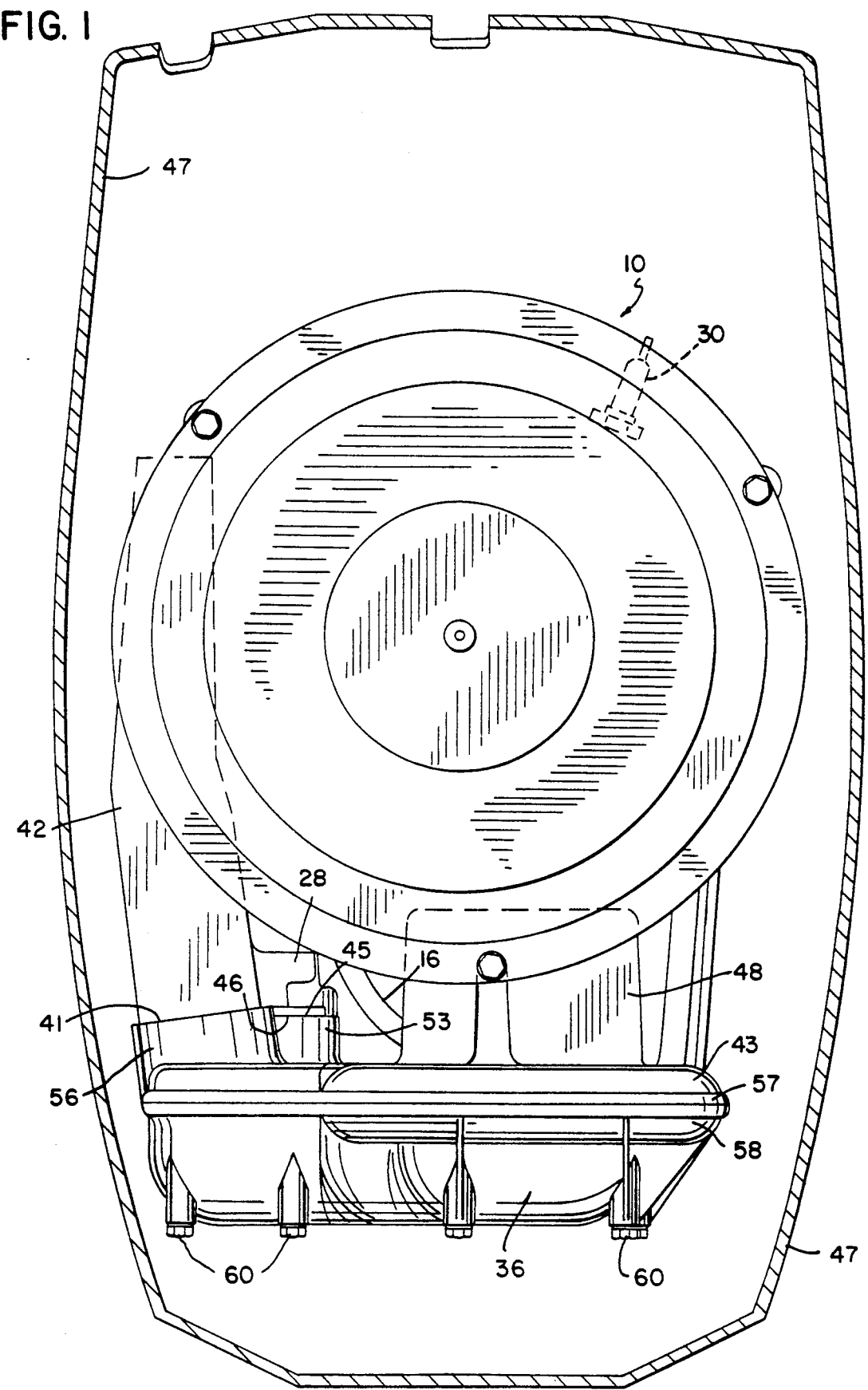
FIG. 1 is a top plan view of a single rotary engine utilizing the tuned intake air system of the present invention.
Figure 2:
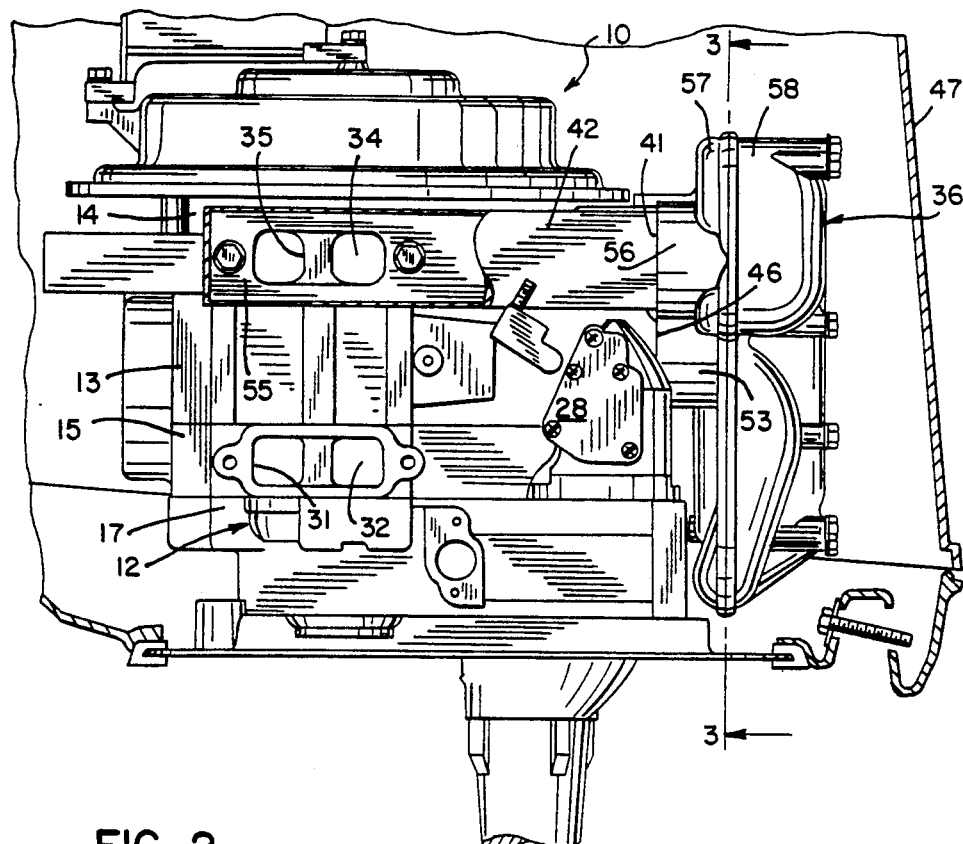
FIG. 2 is a side elevation of the engine shown in FIG. 1.
Figure 3:
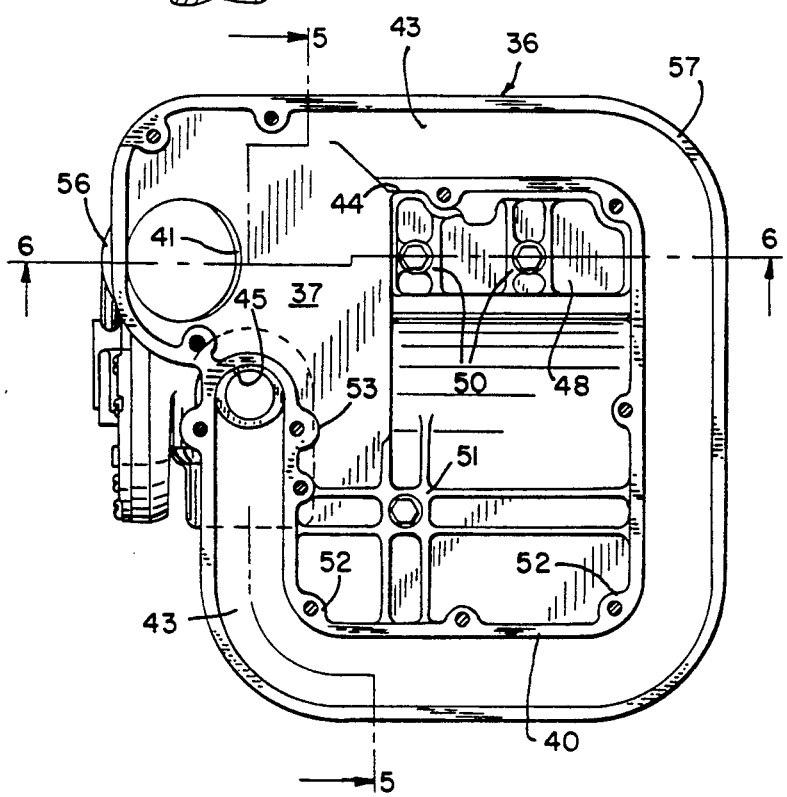
FIG. 3 is a partial vertical section through the intake air system of the engine taken on line 3—3 of FIG. 2.

Referring to FIGS. 1 and 2, a rotary engine 10 of the type utilizing a single rotor 11 is adapted particularly for use in an outboard boat motor. The engine block 12 comprises an intermediate rotor housing 13, an upper housing 14 and a lower housing 15. The upper and lower housings 14 and 15 are attached to opposite faces of the rotor housing 13. Each of the housing members preferably comprises an aluminum or aluminum alloy casting for corrosion resistance and light weight. Some or all of the castings may be made in two pieces.

An exhaust manifold 16 is attached to the outside of the engine block 12 at the rear thereof, and extends downwardly from the rotor housing 13 to the bottom of the lower housing 15. In an outboard motor construction, the exhaust manifold 16 and lower housing 15 are attached to a lower adaptor plate 17 which provides a transition region for engine exhaust discharge and cooling water supply, as well as an enclosure for the lower portion of the engine.

Each of the housing members 13-15 comprising the engine block is provided with a generally centrally located opening to accommodate the assembly of the rotor 11 and a rotor shaft 18. The rotor shaft extends vertically through the engine block and is journaled for rotation therein on upper and lower bearings 20 and 21, respectively, mounted in the central openings in the upper and lower housings 14 and 15. A stationary gear 22 is attached to the upper housing 14 concentrically with the upper bearing 20 and with the axis of rotation of the rotor shaft 18.

The rotor housing 13 includes an enlarged central opening which defines a rotor chamber 23 having a characteristic epitrochoidal configuration which is conventional in rotary engine construction. The rotor shaft 18 extends vertically through the engine block and includes an enlarged cylindrical eccentric portion 24 disposed within the rotor chamber 23. The rotor 11 is rotatably mounted on the cylindrical eccentric 24 by a needle bearing assembly 25 carried on a cylindrical sleeve 26 attached to the inner cylindrical surface of the rotor 11. The cylindrical sleeve 26 includes an integral upwardly extending rotor gear 27 adapted to engage the downwardly extending stationary gear 22. The diameter of the rotor gear 27 is substantially larger than the diameter of the stationary gear 22, thereby providing the eccentric rotary movement of the rotor 11 within the rotor chamber 23 in a manner conventional to the operation of a rotary engine.

A rotary engine may also be constructed with twin rotors, each operating in a separate rotor housing. In addition to obvious differences including a lengthened rotor shaft and exhaust manifold, a twin rotor engine also requires a center housing member between the two rotor housings. With either a twin rotor engine or a single rotor engine, as shown, adaptation of the engine to an outboard motor requires attachment of the lower end of the rotor shaft to the upper end of the rotor shaft to the upper end of an outboard motor driveshaft (not shown). The driveshaft extends downwardly into operative connection with a lower gear case and propeller in a conventional manner.

In operation of the engine 10, the rotor 11 turns in its eccentric path within the rotor chamber 23 (clockwise in FIG. 1) to provide a conventional 4-stroke working cycle. The rotor has three lobes such that stages of three separate cycles, displaced by 120° occur simultaneously. In a typical cycle, a mixture of combustion air and fuel is drawn into the rotor chamber through a carburetor 28 attached to the outer wall of the rotor housing 13. The mixture is compressed by a successive decrease in volume between the face of the rotor and the rotor chamber to the point of ignition from a spark plug 30. Continuing rotation results in the discharge of exhaust gases through an exhaust outlet 29 in the rotor chamber and into the exhaust manifold 16, completing the 4-stroke cycle. Engine cooling water is supplied via a cooling water jacket surrounding the exhaust manifold 16 from which it is circulated by an engine driven water pump through the engine block via water passages in the rotor housing 13 and upper and lower housings 14 and 15, respectively. The cooling water passages in the housings lie generally in the region of engine ignition and exhaust, i.e. generally the semicircumferential portion of the engine including the ignition and exhaust regions of the rotor chamber. Thus, cooling water is preferentially supplied to the areas of the engine block typically experiencing the highest temperature. Details of the construction of the cooling water system are set forth in U.S. Pat. No. 4,915,603.

Supplemental air cooling is provided for the engine 10 by inducing a flow of outside air through the engine block by rotation of the engine. In general, cooling air is supplied to the region of the engine block not cooled directly by water and including generally the intake and compression areas. Intake air may be brought in via either the upper or lower housing 14 or 15, passed through the rotor housing 13, and exhausted via the other housing member 14 or 15. Cooling air from the engine is then used for combustion air by directing it to the carburetor 28 for mixture with engine fuel, in accordance with the system of the present invention to be described.

Cooling air is supplied to the engine through a cooling air opening 31 in the outer side wall of the lower housing 15. From the opening 31, cooling air flows through a cooling air entry passage 32 in the lower housing 15, through the open interior therein and into a rotor chamber air passage 33 between the rotor 11 and the rotor shaft 18. From the rotor chamber 23, the cooling air flows through the inner opening in the adjacent upper housing 14 into a cooling air exit passage 34 therein and out of the engine block via a cooling air exit opening 35 in the outer side wall of the upper housing 14.

Cooling air exiting from the engine via cooling air exit opening 35 is directed into a plenum chamber 36 attached to the rear of the engine block and, in particular, attached directly to the exhaust manifold 16. The plenum chamber includes an inner chamber wall 37, and outer wall 38 spaced from and generally parallel the inner wall, and an enclosing side wall 40 interconnecting the inner and outer walls. The inner plenum chamber wall 37 includes an inlet air opening 41 which is connected to the air exit opening 35 from the engine by an inlet conduit 42. The inlet conduit 42 comprises a short tubular member lying closely adjacent the side wall of the upper housing member 14. The interior of the plenum chamber 36 provides a relatively large open volume to allow expansion of the cooling air entering through the inlet air opening 41 and also provides some attenuation of the pulsed flow of cooling air induced by engine rotation.

The plenum chamber 36 is provided with a tubular outlet conduit 43 formed as an integral part of the chamber sidewall 40 and extending substantially around the periphery thereof. The outlet conduit 43 receives air from the plenum chamber and directs it to the carburetor 28 or other combustion air inlet to the rotor chamber. The extended length of the outlet conduit allows the pulsed air flow to be tuned to provide an optimum flow of intake combustion air and, by wrapping the outlet conduit around the plenum chamber, an extremely compact assembly may be obtained with a corresponding saving in occupied space. An outlet air opening 44 within the plenum chamber opens directly from the interior of the chamber to the upstream end of the outlet conduit 43. The outlet conduit 43 terminates in a combustion air outlet 45 in the inner wall 37 of the plenum chamber at a point immediately adjacent the carburetor 28 for direct connection to the carburetor air inlet 46.

The combustion air outlet 45 from the outlet conduit is positioned closely adjacent the inlet air opening 41 to the plenum chamber. In this manner the long extended pipe with a 180° elbow, characteristic of the prior art, is eliminated and considerable space is saved. Only the relatively short inlet conduit 42 requires any space on the side of the engine block, thereby keeping the overall width of the engine at a minimum. Referring particularly to FIG. 1, this lateral saving in space allows a conventional outboard motor cowl 47 to be used to enclose the engine. The cowl 47 may be essentially identical to one used with a conventional reciprocating piston engine of comparable size and horsepower.

Referring also to FIG. 2, the depth of the plenum chamber, between its inner and outer wall 37 and 38, does not add significantly to the front-to-rear dimension of the outboard motor and, in any event, its location in accordance with the present invention is in an area where typically more space is available inside the cowl 47. To provide an optimum air volume in the plenum chamber 36 without increasing the outer envelope size of the intake air system, the plenum chamber may be extended forwardly to form a supplemental plenum chamber 48 over the top of the exhaust manifold 16.

A pair of upper bosses 50 in the forward wall of the supplemental plenum chamber 48 are suitably bored for the receipt of mounting bolts for attachment to the upper housing 14. A pair of lower bosses 51 and 52 in the main plenum chamber 36 support mounting bolts for attachment respectively to the exhaust manifold 16 and the lower adapter plate 17. A flange 53 surrounding the outlet air opening 44 is adapted to match up with and be bolted to a similar flange 54 on the combustion air inlet 46 to the carburetor 28.

The integral plenum chamber/outlet conduit preferably comprises a two-piece aluminum casting. The casting halves are somewhat similar and essentially split the chamber 36 vertically through the centerline of the outlet conduit 43. The inner half 57 of the casting is bolted to the engine, as previously described. Then the outer half 58 of the casting is bolted to the inner half with a series of attachment bolts 60, with the abutting faces of the casting halves sealed by a gasket if necessary or desired.

The inlet conduit 42 is bolted at one end to a flange 55 surrounding the cooling air exit 35 from the engine. The opposite end of the inlet conduit 42 is tubular and cylindrical in shape and is adapted to fit within an integral sleeve 56 defining the inlet air opening 41 to the plenum chamber 36. Attachment between the conduit 42 and the sleeve 56 may be effected by welding, brazing or the like.

Various modes of carrying out the invention are contemplated as being within the scope of the following claims particularly pointing out and distinctly claiming the subject matter which is regarded as the invention.

I claim:

1. In a rotary internal combustion engine for an outboard board motor, said engine having an engine block including an interior rotor chamber having a rear wall and chamber-enclosing end housing members on opposite sides of the rotor chamber, a rotor shaft extending vertically through the engine block, a rotor operatively connected to the rotor shaft for rotary movement within the rotor chamber, a cooling air passage in one lateral side wall of each member for circulating a flow of air induced by rotation of the rotor from outside the engine block through the rotor chamber, one of said air passages comprising a cooling air entry passage and the other air passage comprising a cooling air exit passage, a combustion air inlet in the rear wall of the rotor chamber adapted to receive air from said cooling air exit passage, an exhaust outlet for engine exhaust gases in the rear wall of the rotor chamber disposed adjacent the combustion air inlet, and an exhaust manifold attached to the engine block over the exhaust outlet, an improved assembly for providing a flow of combustion air to the combustion air inlet comprising:

a plenum chamber attached to the rear of the engine, said plenum chamber including an inlet air opening adapted to receive air from said cooling air exit passage and an outlet air opening for the discharge of air; and said plenum chamber including an inner wall attached to the exhaust manifold, an outer wall disposed closely spaced from and generally parallel to the inner wall, and an enclosing side wall interconnecting said inner and outer walls;

said inlet air opening disposed in the inner wall of said plenum chamber;

an inlet conduit connecting the cooling air exit passage and said inlet air opening, said inlet conduit lying immediately adjacent the end member side wall containing said cooling air exit passage;

an outlet conduit connecting said outlet air opening and the combustion air inlet, said outlet conduit disposed to partially surround the plenum chamber to provide a conduit length substantially greater than the distance from the cooling air exit passage to the combustion air inlet; and, said outlet conduit terminating in a combustion air outlet in the inner wall of said plenum chamber, said combustion air outlet disposed directly adjacent the combustion air inlet and directly connected thereto.

2. The invention as set forth in claim 1 wherein said outlet conduit comprises a tubular member formed integrally with the side wall of the plenum chamber.

3. The invention as set forth in claim 2 wherein said outlet conduit substantially circumscribes said plenum chamber.

4. The invention as set forth in claim 3 wherein said inlet air opening and said combustion air outlet are directly adjacent one another.

5. The invention as set forth in claim 3 including supplemental plenum chamber means extending forwardly with respect to the rear of the engine from said chamber inner wall over the upper portion of the exhaust manifold.

6. The invention as set forth in claim 2 wherein the lateral width of said plenum chamber is substantially equal to the maximum width of the engine block.

7. The invention as set forth in claim 2 wherein said outlet conduit and plenum chamber comprises an aluminum casting.

* * * * *